(12) United States Patent
Latein et al.

(10) Patent No.: US 10,634,429 B2
(45) Date of Patent: Apr. 28, 2020

(54) CONTINUOUS-FLOW DRYER COMPRISING AN EXHAUST AIR RECIRCULATION DEVICE

(71) Applicant: STELA Laxhuber GmbH, Massing (DE)

(72) Inventors: Tobias Latein, Erlbach (DE); Thomas Christian Laxhuber, Massing (DE)

(73) Assignee: STELA Laxhuber GmbH, Massing (DE)

(*) Notice: Subject to any disclaimer, the term of this patent is extended or adjusted under 35 U.S.C. 154(b) by 98 days.

(21) Appl. No.: 15/960,615

(22) Filed: Apr. 24, 2018

(65) Prior Publication Data

US 2018/0306507 A1   Oct. 25, 2018

(30) Foreign Application Priority Data

Apr. 24, 2017   (DE) .................. 10 2017 108 697

(51) Int. Cl.
*F26B 25/06*   (2006.01)
*F26B 23/00*   (2006.01)
(Continued)

(52) U.S. Cl.
CPC .............. *F26B 23/002* (2013.01); *F26B 3/04* (2013.01); *F26B 17/04* (2013.01); *F26B 21/001* (2013.01);
(Continued)

(58) Field of Classification Search
CPC ...... F26B 23/002; F26B 23/007; F26B 23/02; F26B 17/04; F26B 21/04; F26B 3/04; F26B 3/06; Y02P 70/40; Y02P 70/405
(Continued)

(56) References Cited

U.S. PATENT DOCUMENTS 2,113,035 A * 4/1938 Shaw ...................... C14B 1/58
                                                        34/191
2,722,752 A * 11/1955 Morch ................... F26B 15/12
                                                        34/86
(Continued)

FOREIGN PATENT DOCUMENTS

AT       515466 A1    9/2015
DE     2941037 A1    4/1980
(Continued)

OTHER PUBLICATIONS

European Patent Office, Search Report in parallel application EP 18 16 8866, dated Aug. 21, 2018.

*Primary Examiner* — John P McCormack
(74) *Attorney, Agent, or Firm* — Smartpat PLC

(57) ABSTRACT

A continuous-flow dryer for drying a material by hot air is provided with a first and a second section, through which the material flows successively in a transport direction. It includes a fresh air supply device, an exhaust air recirculation device for removing exhaust air and for recirculating exhaust air as supply air, and a heat exchanger, through which fresh air and exhaust air are led, for transferring waste heat of the exhaust air into the fresh air. With the exhaust air recirculation device a first part of the exhaust air is removed from the first section and recirculated directly into the first section. Furthermore, a second part of the exhaust air is removed from the first section, led through the heat exchanger, and recirculated as supply air into the first section. The fresh air supply device supplies fresh air as supply air into the second section.

10 Claims, 1 Drawing Sheet

(51) Int. Cl.
*F26B 3/04* (2006.01)
*F26B 21/06* (2006.01)
*F26B 17/04* (2006.01)
*F26B 21/00* (2006.01)
*F26B 21/04* (2006.01)
*F26B 23/02* (2006.01)
*F26B 25/14* (2006.01)

(52) U.S. Cl.
CPC .............. *F26B 21/04* (2013.01); *F26B 21/06* (2013.01); *F26B 23/02* (2013.01); *F26B 25/14* (2013.01); *Y02P 70/405* (2015.11)

(58) Field of Classification Search
USPC ... 34/467, 86, 443, 474, 475, 487, 493, 507, 34/510, 72, 209, 210, 236, 218–220
See application file for complete search history.

(56) References Cited

U.S. PATENT DOCUMENTS

| | | | |
|---|---|---|---|
| 4,255,870 A | 3/1981 | Malmquist | |
| 10,168,097 B2 * | 1/2019 | Cerciello | ................ F26B 13/10 |

FOREIGN PATENT DOCUMENTS

| | | |
|---|---|---|
| DE | 102014200751 A1 | 7/2015 |
| EP | 2587203 A1 | 5/2013 |
| WO | 2012075518 A1 | 6/2012 |
| WO | 2014168559 A1 | 10/2014 |
| WO | 2015127490 A1 | 9/2015 |
| WO | 2017133727 A1 | 8/2017 |

* cited by examiner

CONTINUOUS-FLOW DRYER COMPRISING AN EXHAUST AIR RECIRCULATION DEVICE

TECHNICAL FIELD

The invention relates to a continuous-flow dryer for drying a material by means of hot air, comprising a fresh air supply device for supplying fresh air as supply air, an exhaust air recirculation device for removing exhaust air and recirculating it as supply air and a heat exchanger, through which fresh air on the one hand and exhaust air on the other hand are led, for transferring waste heat of the exhaust air into the fresh air.

BACKGROUND

Continuous-flow dryers are dryers, in which material to be dried is transported continuously or in batches through the dryer. Such a dryer is in particular a belt dryer which conveys the material to be dried through the continuous-flow dyer by means of a belt. The material to be dried, for example sewage sludge, wood chips, hogged wood, RDF (refuse-derived fuel), SSW (solid shredded waste), MSW (municipal solid waste), household waste, grass or agricultural products and by-products such as sugar beet pulp, is here at first damp or wet. The material is dried by moisture being removed from it by means of hot air. The hot air is separately produced by heating in particular air from the surroundings of the continuous-flow dryer. On heating the air, the relative air moisture of this air decreases, the air becomes "drier". This hot air with low relative air moisture then flows through and around the constituents to be dried in the continuous-flow dryer.

For heating the air to hot air, energy is of course needed. This energy is lost when the hot air generated is discharged into the surroundings after the drying of the material. First steps for circulating the hot air are therefore known.

The material to be dried is at the same time conveyed in a transport direction through the continuous-flow dryer and in so doing preferably runs through a plurality of sections. The individual section divides the continuous-flow dryer spatially. The sections can for this purpose be largely separated from one another in terms of air flow. Different air flows are thus possible in the sections, which can each have different relative air moistures and different temperatures.

For supplying air to the continuous-flow dryer a fresh air supply device is provided, which supplies generally dry fresh air, removed from the surroundings, to the continuous-flow dryer as supply air.

In the case of such continuous-flow dryers it is further known to provide an exhaust air recirculation device, by means of which exhaust air is removed from the drying process and then at least partly recirculated into the continuous-flow dryer. In so doing, a part of the exhaust air is led through a heat exchanger, through which also supplied fresh air is led. Thus, thermal energy or waste heat from the exhaust air can be transferred to the supply air.

SUMMARY

The object on which the invention is based is to provide a continuous-flow dryer for drying a material by means of hot air which makes possible with low energy consumption at the same time particularly low dust emissions compared with known continuous-flow dryers.

This object is achieved according to the invention with a continuous-flow dryer for drying a material by means of hot air, which is provided with a first and a second section through which the material flows successively in a transport direction, which is provided with a fresh air supply device for supplying fresh air as supply air, which is provided with an exhaust air recirculation device for removing exhaust air and for recirculating exhaust air as supply air, and which is provided with a heat exchanger, through which fresh air on the one hand and exhaust air on the other hand are led, for transferring waste heat of the exhaust air into the fresh air. According to the invention, a removal device for removing a partial exhaust air from the continuous-flow dryer is provided.

The exhaust air removed in this way according to the invention is completely eliminated from the drying region, that is to say in particular the space enclosing the conveyor belt and the material there. This exhaust air is accordingly to be replaced by further supply air. With such a complete removal of air from the continuous-flow dryer, there arises in the latter overall a negative pressure, whereby a discharge of dust from the continuous-flow dryer into its surroundings can be avoided.

The removal device for removing a part of the exhaust air is preferably arranged in the flow direction of the exhaust air after the heat exchanger. Thus, preferably the entire exhaust air to be removed is withdrawn from the recirculated air flow only after the heat exchanger. With such air guidance, at the heat exchanger this exhaust air, to be later completely removed, firstly still has its waste heat withdrawn from it. Only thereafter is this part of the exhaust air then completely removed and in particular discharged into the surroundings of the continuous-flow dryer.

In this case, advantageously a device is provided, in particular in the form of at least one flap and/or at least one fan, by means of which the amount of completely removed exhaust air in relation to the amount of recirculated exhaust air is to be controlled.

Preferably, furthermore a first and a second section are provided, through which the material is passed successively in a transport direction, the fresh air supply device being designed for supplying fresh air as supply air into the first section, and the exhaust air recirculation device for removing exhaust air from the second section and for recirculating it as supply air back into the second section. With such a division of sections the exhaust air of one section of the continuous-flow dryer is withdrawn, in which this exhaust air is highly saturated with moisture but still comparatively not very hot. With such exhaust air the aforementioned condensation effect and resulting withdrawal of heat due to phase transformation can be particularly highly utilized.

Alternatively, advantageously a first and a second section are provided, through which the material is passed successively in a transport direction, the fresh air supply device being designed for supplying fresh air as supply air into the second section, and the exhaust air recirculation device being designed for removing exhaust air from the first section and for recirculating it as supply air back into the first section. The exhaust air is then withdrawn from a rear part of the continuous-flow dryer, in which this exhaust air is not necessarily completely saturated but in any case is comparatively hot. With such exhaust air, fresh air can be preheated to a relatively high temperature.

On the continuous-flow dryer according to the invention further advantageously a heater is provided, by means of which the fresh air is to be heated up before being supplied as supply air. The supplied fresh air can thus be precisely regulated to the desired drying temperature.

Furthermore a heater is preferably provided on the continuous-flow dryer according to the invention, by means of which the exhaust air led through the heat exchanger is to be heated up before being supplied as supply air. Thus the recirculated exhaust air can also be improved with regard to its relative air moisture and processed before it is recirculated into the respective section of the continuous-flow dryer again.

Advantageously, the heat exchanger according to the invention is dimensioned such that moisture condenses out on it from the exhaust air. Moisture condenses out when the relative air moisture of the respectively relevant air has reached 100% (in words: one hundred percent). The relative air moisture in air increases when the air, as in this case the hot exhaust air, cools. The condensing-out sought according to the invention is preferably achieved by the moisture condensing out at a separating surface of the heat exchanger. For this the exhaust air releases so much thermal energy to the separating surface that the relative air moisture in the exhaust air reaches 100%. The first heat exchanger according to the invention thus advantageously has three functions. The first function is the dehumidifying of the exhaust air which flows through the first heat exchanger. The second function is the heating of the supplied fresh air. The third function is the reducing of the relative air moisture of the supplied fresh air, caused by the heating of this fresh air.

The exhaust air recirculation and/or the fresh air supply are preferably each provided with a suction device, by means of which the air to be conveyed is firstly sucked through the material to be dried and then is recirculated or removed. By conveying the air in such a manner by means of sucking and not by means of blowing, a negative pressure can be produced within the material and the aforementioned sections which prevents dust from these regions getting to the outside.

Advantageously, in at least one of the sections, there is further provided an exhaust air sensor by means of which in the exhaust air its moisture is to be determined. Such an air sensor determines in particular the relative air moisture and/or the temperature of the air flowing against or around it. Advantageously, the relative air moisture of the exhaust air is thus to be determined by means of the exhaust air sensor. When the relative air moisture of the exhaust air is known, it is possible by means of a control to define whether this exhaust air is to be dehumidified or whether this air is to be supplied directly to the respective section or the respective region again.

Alternatively or additionally, a supply air sensor is further provided, by means of which in the supply air its moisture is to be determined. The supply air sensor determines the relative air moisture of the flowing-against supply air. It is thus advantageous to determine the relative air moisture with which the supply air flows into the respective section. It is thus particularly advantageous also to determine whether and by how many degrees Celsius the supply air is to be additionally heated by a heater to achieve a desired relative air moisture in the supply air.

In a preferred manner, for transporting the material through the continuous-flow dryer two belts are further provided, which are assigned in particular to the first section and the second section. Such a two-part belt in a continuous-flow dryer makes it possible for each of the two sections to have their own belt. Thus, the two sections can also be arranged spatially separated from each other, in particular above each other.

Further, preferably also a regulating device is provided, by means of which the moisture in the exhaust air is to be measured and an air guide in the exhaust air recirculation device, in the first heat exchanger and/or in the second heat exchanger is to be regulated. A regulating device or control evaluates inputs of the regulating device and regulates or controls by means of logic of the regulating device its outputs. Electrical signals of sensors of different type, such as for example a temperature sensor or a moisture sensor, serve as inputs here. Mostly switches or electrical signals, for example for controlling the heater, serve as outputs. By means of the regulating device, advantageously the air guide, in particular by means of ventilation, in the exhaust air recirculation device is to be adapted to the respectively prevailing relative air moisture of the exhaust air.

The invention is also directed to a method for operating a continuous-flow dryer for drying a material by means of hot air, wherein fresh air is supplied as supply air, exhaust air is removed and recirculated as supply air, and by means of a heat exchanger waste heat of the exhaust air is transferred into the fresh air. According to the invention, a partial exhaust air is completely removed from the continuous-flow dryer.

BRIEF DESCRIPTION OF THE DRAWINGS

An exemplary embodiment of the solution according to the invention is explained in more detail below with the aid of the appended schematic drawings, in which.

DETAILED DESCRIPTION

Figure 1:
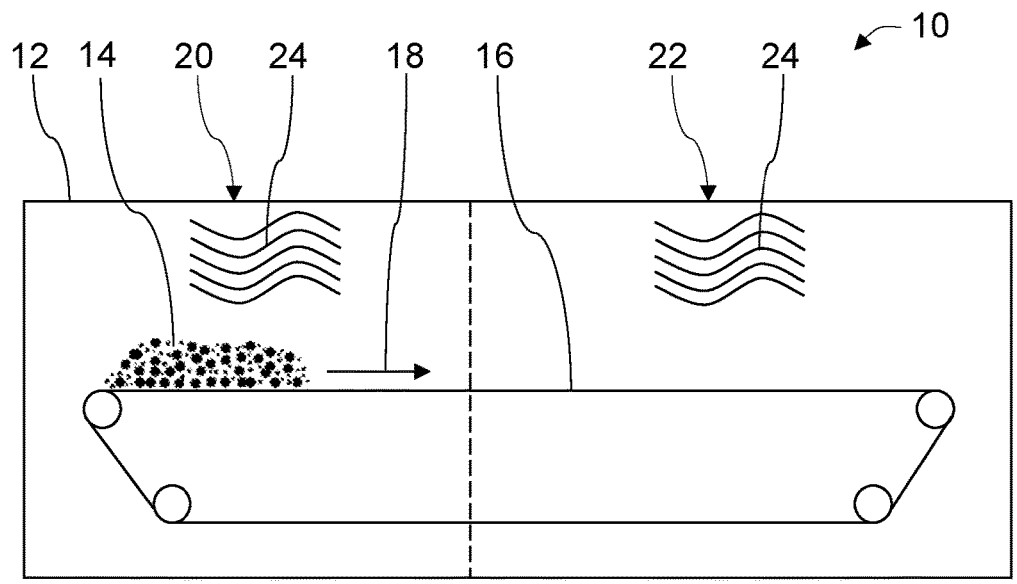
FIG. 1 shows a highly simplified longitudinal section of a continuous-flow dryer according to the prior art and FIG. 2 shows a highly simplified longitudinal section of a continuous-flow dryer according to the invention.
Figure 2:
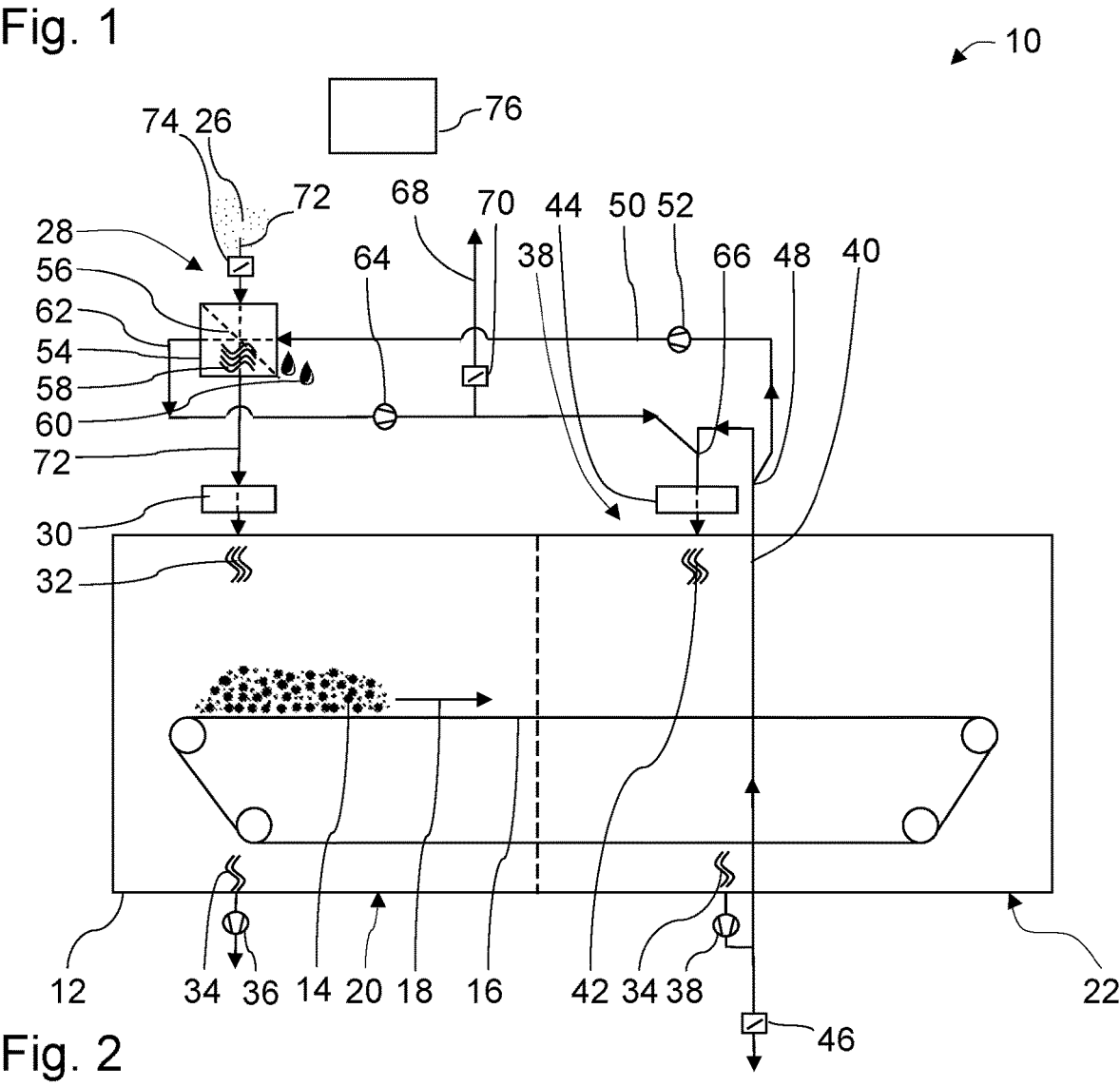

In FIGS. 1 and 2 there is each shown a continuous-flow dryer 10 in the form of a belt dryer. The continuous-flow dryer 10 has a housing 12, through which the initially moist or wet material 14 is to be transported by means of a belt 16 in a transport direction 18 through the continuous-flow dryer 10.

During transport, the material 14 passes firstly through a first section 20 and after that a second section 22. The two sections 20 and 22 divide the housing 12 spatially. In the transport direction they are largely separated from one another in terms of air flow, if necessary, by means of one dividing wall or a plurality of dividing walls. The sections 20 and 22 can also for their part be further subdivided into subsections.

Within the housing 12 there is hot air 24 which withdraws moisture (not shown) from the material 14 to be dried. With the withdrawing of moisture from the material 14, the material 14 becomes drier, it is dried.

FIG. 2 illustrates how such a material 14 is dried by means of hot air in the continuous-flow dryer 10, according to the invention, there. For drying, fresh air 26 flows from outside in the first section 20 into the housing 12, conveyed by a fresh air supply device 28, into the housing 12. The fresh air 26 flows through a first heater 30 which heats the fresh air 26 on its way through the heater 30. With the heating of the fresh air 26, the relative air moisture of the fresh air 26 decreases, the fresh air 26 becomes "drier".

This fresh air 26, after the heating, is referred to as the supply air 32. The supply air 32 flows into the section 20 and there flows around the individual particles of the material 14 or it flows through the layer of the material 14 on the belt 16.

On this flowing around the particles of the material 14, the supply air 32 takes up moisture from the material 14. The relative air moisture of the supply air 32 increases, the supply air 32 becomes "more moist". The moistened supply air 32 is subsequently discharged from the housing 12 into surroundings thereof from the section 20 as exhaust air 34 by means of an exhaust air outlet 36 with a fan. This exhaust air 34 thus constitutes outgoing air.

The material 14 then passes from the first section 20 into the second section 22. In the second section 22, exhaust air 34 is discharged at the bottom. This exhaust air 34 is led by means of an exhaust air recirculation device 38, which comprises in particular a fan, to a recirculation line 40. Through the recirculation line 40, this exhaust air 34 is largely recirculated again into the section 22 as supply air 42.

A flap 46 can be connected to the recirculation line 40, through which flap a part of the exhaust air 34 can be discharged directly into the surroundings of the continuous-flow dryer 10.

At the outlet of the recirculation line 40 there is arranged a heater 44, by means of which the recirculated exhaust air 34 can be heated up before its re-entry as supply air 42 into the section 22. The heater 44 may be, but does not necessarily have to be, provided. Alternatively, the heater 44 can also have a comparatively small heat capacity. The exhaust air 34 from the section 22 is thus largely recirculated directly as supply air 42 into the section 22 by means of the exhaust air recirculation device 38.

The recirculation line 40 further has a branch 48, to which a line 50 is connected. At the branch 48, a part of the exhaust air 34 is branched off from the recirculation line 40 and led out by means of the line 50. For this purpose, a sucking fan 52 to be separately regulated can be arranged in the line 50. The line 50 leads the branched-off exhaust air to a heat exchanger 54, and through it.

The heat exchanger 54 has a separating surface 56 at which, on one side, the branched-off exhaust air 34 is led out of the first section 22 as heat-supplying air and, on the other side, the fresh air 26 is led along as heat-discharging air. At the separating surface 56, heat therefore changes from the exhaust air 34 as waste heat 58 to the fresh air 26. At the same time, water 60 condenses out of the exhaust air 34 at the separating surface 56 with the cooling of the exhaust air 34.

A recirculation line 62 leads the air, thus cooled and condensed out, as supply air 42 back into the second section 22. For this purpose, a sucking fan 64 to be separately regulated can be arranged in the recirculation line 62. The recirculation line 62 leads at a junction 66, in the flow direction after the branch 48, into the recirculation line 40.

In the flow direction shortly after the fan 64, a line 68 leading outwards into the surroundings of the continuous-flow dryer 10 branches off with a flap 70 arranged therein. This line 68 serves, with the associated flap 70, to discharge cooled exhaust air 34 from the recirculation line 62 into the surroundings.

With such a discharge of a part of the exhaust air 34 into the surroundings of the continuous-flow dryer 10, a slight negative pressure arises in the section 22. To equalise this negative pressure, air from the surroundings of the continuous-flow dryer 10 is forced into the first section 22 from outside. At the same time, no air and thus also no dust can escape to the outside from the section 22. In this case, the material 14 to be dried in the section 22 is already comparatively dry and therefore particularly prone to dust formation. The supply of air from outside into the section 22 therefore prevents a dusting of the surroundings of the continuous-flow dryer 10.

The fresh air 26 is led by means of a supply line 72 through the heat exchanger 54 and, as explained above, through the heater 30 into the first section 20. In so doing, the amount of supply air 32 thus supplied is controlled by means of a flap 74 which is arranged in the supply line 72 before the heat exchanger 54.

The flaps and fans mentioned are controlled, and in particular regulated, altogether by means of a control 76, with various measuring devices and sensors (not shown) coupled to the control 76 being able to be provided.

LIST OF REFERENCE SYMBOLS 10 continuous-flow dryer
12 housing
14 material
16 belt
18 transport direction
20 section
22 section
24 hot air
26 fresh air
28 fresh air supply device
30 heater
32 supply air
34 exhaust air
36 exhaust air outlet
38 exhaust air recirculation device
40 recirculation line
42 supply air
44 heater
46 flap
48 branch
50 line
52 fan
54 heat exchanger
56 separating surface
58 waste heat
60 water
62 recirculation line
64 fan
66 junction
68 line
70 flap
72 supply line
74 flap
76 control

What is claimed is:

1. A continuous-flow dryer (10) having two sections for drying a material (14) with hot air (24), comprising:
    a fresh air supply device (28) for supplying fresh air (26) as supply air (32) into one of the two sections (20);
    an exhaust air recirculation device (38) for removing exhaust air (34) from a further of the two sections (22) and for recirculating a portion of the exhaust air as recirculated supply air (42) into the further of the two sections through a recirculation line (40);
    a heat exchanger (54), through which fresh air (26) on the one hand and exhaust air (34) on the other hand are led, for transferring waste heat of the exhaust air (34) into the fresh air (26);
    a line (50) which branches off the recirculation line (40) and through which a further portion of the exhaust air (34) is led to the heat exchanger (54); and a removal device (68, 70) for removing another portion of the exhaust air (34) from the continuous-flow dryer (10).

2. The continuous-flow dryer according to claim 1, wherein the removal device (68, 70) is arranged, in flow direction of the exhaust air (34), after the heat exchanger (54).

3. The continuous-flow dryer according to claim 1, wherein a device (38, 46, 52, 64, 70) for controlling an amount of removed exhaust air (34) in relation to an amount of recirculated exhaust air (34) is provided.

4. The continuous-flow dryer according to claim 1, wherein the material (14) is passed successively in a transport direction (18) from the one of the two sections to the further of the two sections, the second section.

5. The continuous-flow dryer according to claim 1, wherein the material (14) is passed successively in a transport direction (18) from the further of the two sections to the one of the two sections.

6. The continuous-flow dryer according to claim 1, wherein a heater (30) is provided, by means of which the fresh air (26) is to be heated up before being supplied as supply air (32).

7. The continuous-flow dryer according to claim 1, wherein a heater (44) is provided, by means of which the exhaust air (34) led through the heat exchanger (54) is to be heated up before being supplied as recirculated supply air (42).

8. The continuous-flow dryer according to claim 1, wherein the heat exchanger (54) is dimensioned such that water condenses out on it from the exhaust air (34).

9. The continuous-flow dryer according to claim 1, wherein the exhaust air recirculation device (38) is provided with a suction device for sucking out exhaust air (34).

10. A method for operating a continuous-flow dryer (10) for drying a material (14) with hot air (24), comprising:

supplying fresh air (26) as supply air (32) into one of two sections of the continuous-flow dryer (10);

removing exhaust air (34) from a further of the two sections;

feeing a portion of the exhaust air as recirculated supply air (42) back into the further of the two sections;

feeding a further portion of the exhaust air to a heat exchanger (54);

transferring, by the heat exchanger (54), waste heat (58) from the further portion of the exhaust air (34) into the fresh air (26); and removing a balance of the exhaust air (34) from the continuous-flow dryer (10).

* * * * *